US00RE41687E

(19) United States
(12) Reissued Patent
Yun

(10) Patent Number: US RE41,687 E
(45) Date of Reissued Patent: Sep. 14, 2010

(54) DISK CALIBRATION AND SEARCH METHOD IN A CD-ROM DRIVE SYSTEM

(75) Inventor: Ki-Bong Yun, Anyang (KR)

(73) Assignee: Samsung Electronics Co., Ltd., Yeongtong-gu, Suwon-si, Gyeonggi-do (KR)

(21) Appl. No.: 09/665,183

(22) Filed: Sep. 15, 2000

Related U.S. Patent Documents

Reissue of:
(64) Patent No.: 5,808,982
Issued: Sep. 15, 1998
Appl. No.: 08/647,421
Filed: May 13, 1996

(30) Foreign Application Priority Data

May 13, 1995 (KR) ..... 11815/1995

(51) Int. Cl.
*G11B 7/00* (2006.01)
*G11B 5/596* (2006.01)

(52) U.S. Cl. ..... 369/44.28; 369/30.13; 369/30.15; 369/32.01; 360/78.14

(58) Field of Classification Search ..... 369/30.01, 369/32.01, 47.28, 47.36, 47.38, 47.4, 53.29, 369/53.3, 44.27, 44.28, 30.13, 30.15; 360/78.04, 360/78.06, 78.07, 78.08, 78.14
See application file for complete search history.

(56) References Cited

U.S. PATENT DOCUMENTS 4,057,832 A * 11/1977 Kappert ..... 386/126
4,509,154 A * 4/1985 Kimoto ..... 369/30.27
4,719,610 A 1/1988 Bates et al.
4,740,939 A 4/1988 Kimura et al.
4,955,009 A 9/1990 Nakatsu et al.
4,989,190 A 1/1991 Kuroe et al.
5,001,570 A * 3/1991 Tagawa ..... 386/70
5,285,432 A 2/1994 Nakane
5,323,368 A 6/1994 Semba
5,343,131 A 8/1994 Baumann ..... 318/561
5,375,108 A * 12/1994 Suzuki ..... 369/44.28
5,398,222 A 3/1995 Kim
5,408,454 A 4/1995 Hasegawa
5,477,513 A 12/1995 Onodera et al.
5,481,517 A 1/1996 Yoshimoto et al.
5,590,101 A 12/1996 Itoi
5,592,448 A 1/1997 Suzuki et al.
5,604,720 A 2/1997 Kimura et al.
5,646,915 A 7/1997 Ogino
5,719,836 A 2/1998 Lewis

* cited by examiner

*Primary Examiner*—Paul Huber
(74) *Attorney, Agent, or Firm*—Robert E. Bushnell

(57) ABSTRACT

A disk calibration and search method in a disk drive is provided, in which, after an initialization step, a pickup is jumped to a first position and moved radially in a predetermined direction in response to pulses generated by a frequency generator. During this radial movement the number of tracks crossed [are] *is* counted. The counting is continued until a predetermined number of the pulses generated by the frequency generator have been generated. A calculated frequency generator track number is then obtained by dividing the counted number of tracks by the predetermined number of pulses generated by the frequency generator, i.e., calculating a unit track number of the disk per a single movement of the pickup, that is, the number of tracks the pickup moves per pulse generated by the frequency generator. The calculated frequency generator track number is stored in memory used to control the frequency generator for jumping the pickup during a search for a target track. An average pitch between the tracks is calculated in accordance with the calculated unit track number; and a moving amount for a drive to jump the pickup from a current position to a target track is then determined. The calibration and search methods will be described in greater detail below.

46 Claims, 7 Drawing Sheets

(NEW)

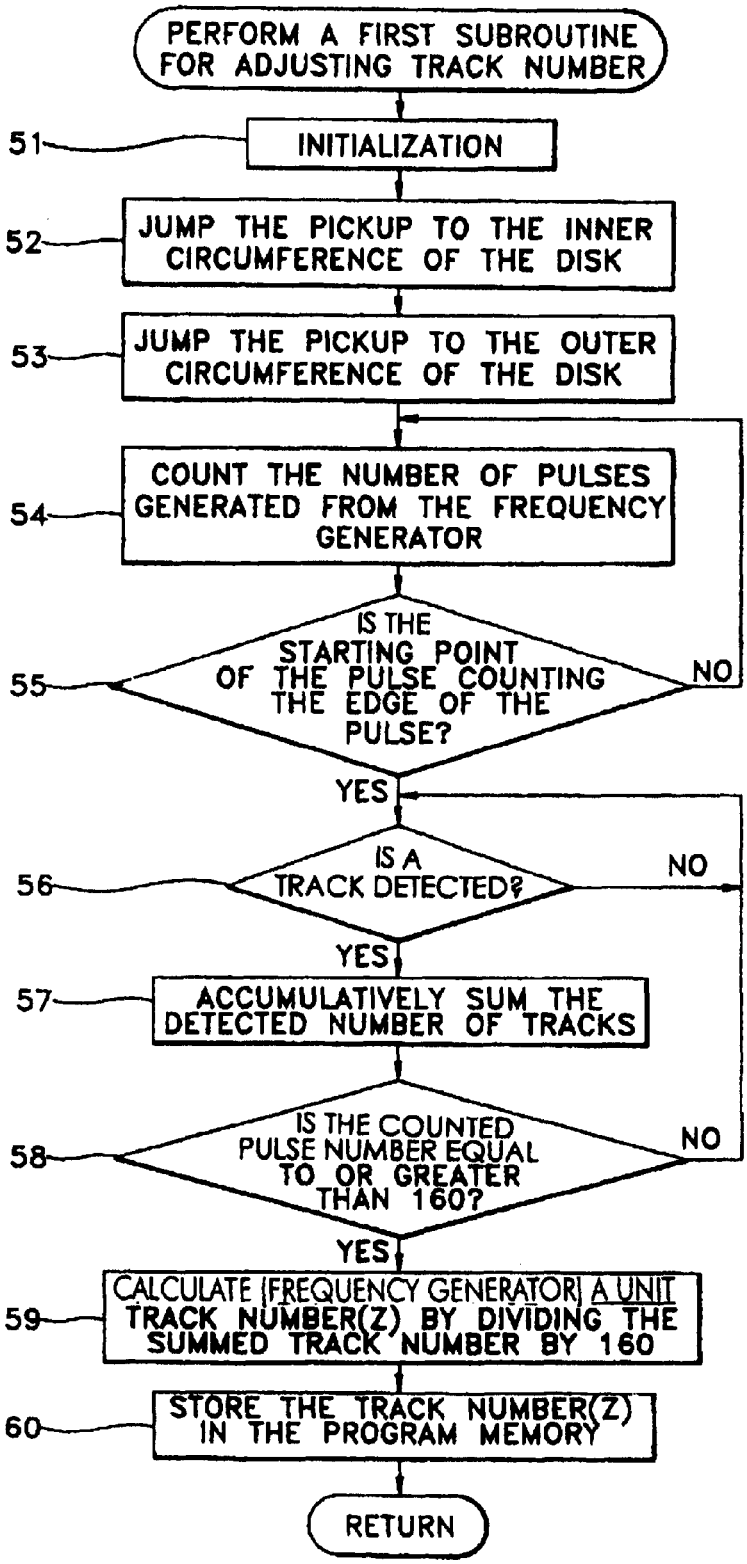
FIG. 5 (Amended)

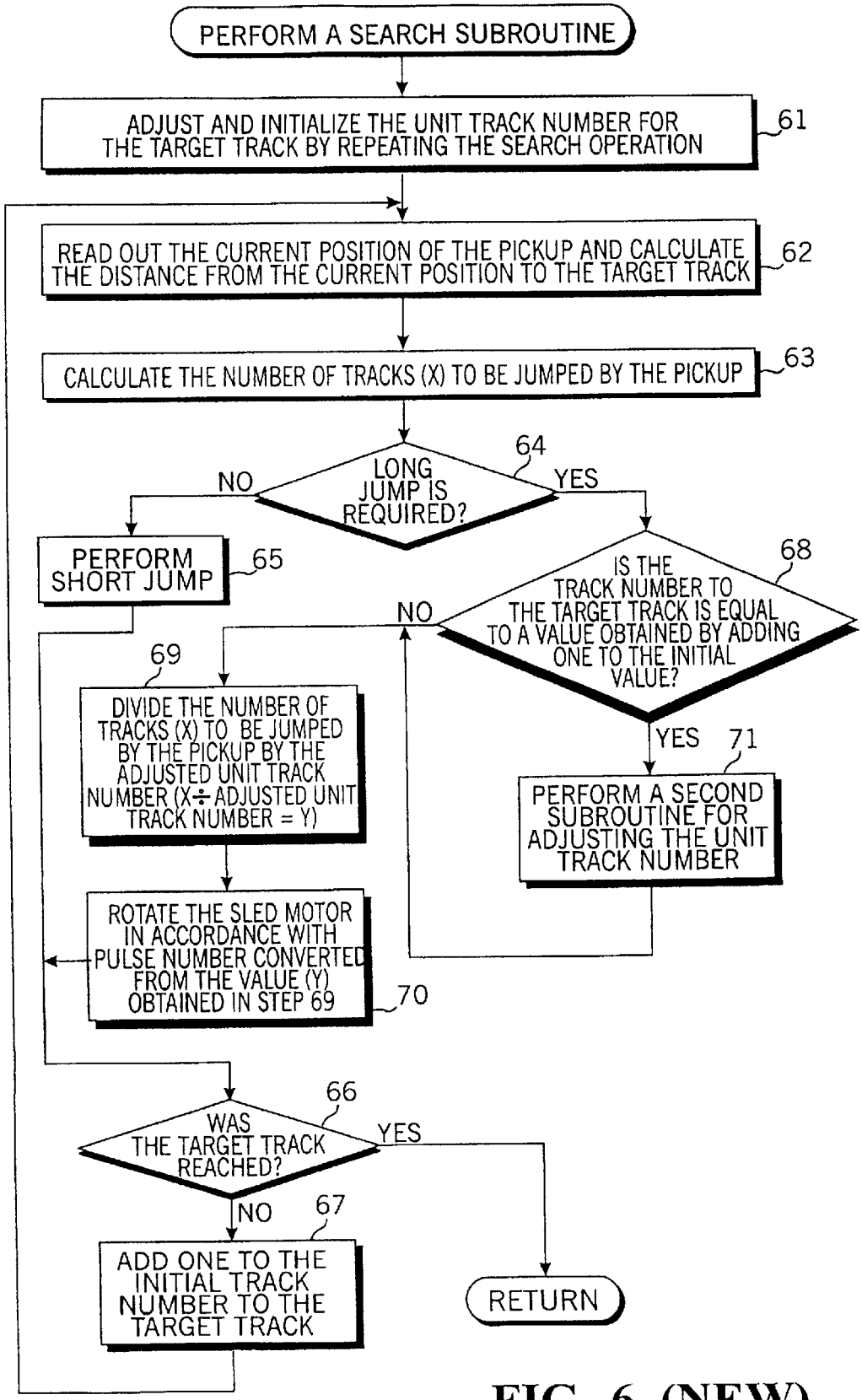
FIG. 6 (NEW)

(Amended)

DISK CALIBRATION AND SEARCH METHOD IN A CD-ROM DRIVE SYSTEM

Matter enclosed in heavy brackets [ ] appears in the original patent but forms no part of this reissue specification; matter printed in italics indicates the additions made by reissue.

CROSS REFERENCE TO RELATED APPLICATIONS

This application makes reference to, incorporates the same herein, and claims all benefits accruing under 35 U.S.C. §119 from an application entitled Disk Calibration Method In CD-ROM Drive System earlier filed in the Korean Industrial Property Office on 13 May 1995, and there duly assigned Serial No. 95-11815 by that Office.

BACKGROUND OF THE INVENTION

The present invention relates to a disk drive such as a compact disk, and more particularly, to a disk calibration and search method for a compact disk read only memory (i.e., a CD-ROM) disk drive, for increasing the setting accuracy of the number of disk tracks when a pickup searches the disk tracks in the disk drive.

As currently manufactured in commercial quantities, a compact disk is a small disk with, for example, a twelve centimeter outer diameter, on which a plurality of concentric or spiral tracks are formed along one side of the disk. These tracks comprise a multitude of fine grooves whose size corresponds to several micrometers are formed, and represent predetermined digitalized signals such as audio information signals and computer information signals. Each groove is called a pit and the space between the pits are called islands or lands. Generally, the tracks are spirally arranged from the center of the disk and the interval between the tracks is known as a pitch, and this interval or pitch is generally 1.6 μm.

When driving a sled motor for transferring a pickup of the compact disk drive radially across *the* disk, the rotation of the sled motor is controlled using a general frequency generator with a predetermined number of tracks in the disk corresponding to a single pulse generated from the frequency generator. For example, if a compact disk drive is designed such that a constant number of track zero crossing signals are always generated on the basis of a single rotation of the disk, due to manufacturing tolerances encountered during commercial production of the disk, the width of the pitch formed on the disk may vary between 1.4 μm to 1.8 μm, which are smaller and greater than the preferred standard pitch of 1.6 μm, respectively. That is, since the width of the pitch is not uniform, a different number of track zero crossing signals is generated for each disk. In addition, the difference in pitch causes an error in calculations performed during a track searching operation.

Therefore, in order to solve the above problem relating to the error in the above mentioned calculation, conventional compact disk drives adopt a method in which a program area of the disk is divided into twenty-four pages and the search is performed from a current page to an arbitrary page different from the current page, and then a searching error detected from the search process is reflected in the current page to update data of the current page. According to the conventional method, sufficient data updating should be achieved with respect to each current page so as to secure the ensuing correct search. Also, due to the deviation generated when the pickup searches the tracks from the inner circumference to the outer circumference of the disk, or from the outer circumference to the inner circumference of the disk, a microcomputer inner memory of 24(pages)×2×2 bytes is used, which I have discovered causes a lower efficiency in usage of the memory. Also, I have found that when the borders of the twenty-four pages of the disk are searched, the result obtained by calculating the track number is not particularly reliable. In addition, I have observed that when measuring the access time in the initial driving state of a compact disk drive, the track number is set on the basis of a test performance of only 100 to 500 access time measurements. Accordingly, since contemporary compact disk drives are not sufficiently stable, accuracy of the track search by the pickup is lowered.

SUMMARY OF THE INVENTION

It is therefore, an object of the present invention to provide an improved compact disk calibration process and apparatus.

It is another object to provide an improved process and an apparatus for locating the track of a circular memory such as a compact disk.

It is yet another object to provide a process and an apparatus for adjusting the calibration of a drive for a circular memory such as a compact disk.

It is still another object to provide a disk calibration process and disk drive, for increasing the [setting] accuracy [of] *in setting* the track number of a disk and improving efficiency when using a memory by minimizing the error in calculation of the track number when a pickup searches the [disk] *disks'* tracks on the memory in the disk drive.

To achieve these and other objects, there is provided a disk calibration and search process and apparatus for a disk drive, in which, after an initialization step, a pickup is jumped to a first position and moved radially in a predetermined direction in response to pulses generated by a frequency generator. During this radial movement the number of tracks crossed [are] *is* counted. The counting is continued until a predetermined number of the pulses generated by the frequency generator have been generated. A calculated frequency generator track number is then obtained by dividing the counted number of tracks by the predetermined number of pulses generated by the frequency generator, ie., calculating a unit track number of the disk per a single movement of the pickup, that is, the number of tracks the pickup moves per pulse generated by the frequency generator. The calculated frequency generator track number is stored in memory used to control the frequency generator for jumping the pickup during a search for a target track. An average pitch between the tracks is calculated in accordance with the calculated unit track number; and a moving amount of a drive to jump the pickup from a current position to a target track is then determined.

Also, the disk calibration apparatus and process contemplates performing a searching operation by jumping the pickup from the current position to the target track. Here, the searching operation may be performed by jumping the pickup to a target track to check the track number [to] *of* the target track, thereby initializing the track number with the checked track number; reading from the track the current location of the pickup on the disk and calculating *the* number (X) of tracks existing between the current position and the target track, *where* (*X*) *is* the [track] number [(X)] *of tracks* to be jumped by the pickup; determining whether a long jump [of] *by* the [pick up] *pickup* is required or not; performing a short [jumping of] *jump by* the pickup and determining whether the pickup jumps to the target track if it is determined in the searching operation that the long jump is not required; adjusting the initialized track numbers to the target track and returning the process to the step of reading the current location of the pickup on the disk if it is determined that the pickup has not jumped to the target track; checking whether the track number to the target track is equal to a value obtained by adding one to the initial value if it has been determined that a long jump is required; dividing the track number (X) to be jumped by the pickup by the initialized track number to the target track, the initialized track number being obtained from the pitch if the track number to the target is not equal to a value obtained by adding one to the initial value and moving the driving means of the pickup on the basis of the value obtained; and readjusting the track number by regulating an average pitch if it has been determined that the track number to the target track is equal to a value obtained by adding one to the initial value.

The track number may be re-adjusted by comparing the current jumping direction of the pickup and the previous jumping direction to check whether both jumping directions are the same each other; dividing the track number (X) to be jumped by the pickup by a reference value and adding the obtained value to the previously accumulated value to provide a first accumulated value if it has been determined that the current and previous jumping directions are the same; determining whether the first accumulated value exceeds the reference value; adjusting the unit track number by adding a predetermined value to the unit track number if the first accumulated value exceeds the reference value; dividing the track number (X) to be jumped by the pickup by the reference value and subtracting the obtained value from the previously accumulated value to provide a second accumulated value it has been determined that the current jumping direction is not equal to the previous jumping direction; determining whether the second accumulated value is below zero; and adjusting the unit track number by subtracting a predetermined value from the unit track number if the second accumulated value has been determined to be below zero.

BRIEF DESCRIPTION OF THE DRAWINGS

The above object and advantages of the present invention will become more apparent by describing in detail a preferred embodiment thereof with reference to the attached drawings in which:

FIG. 5 is a flowchart illustrating the steps for performing a first subroutine for adjusting track numbers in the disk calibration process performed according to the principles of the present invention;

FIG. 6 is a flowchart illustrating the steps for performing a search subroutine in the disk calibration process performed according to the principles of the present invention.

DETAILED DESCRIPTION OF THE INVENTION

Figure 1:
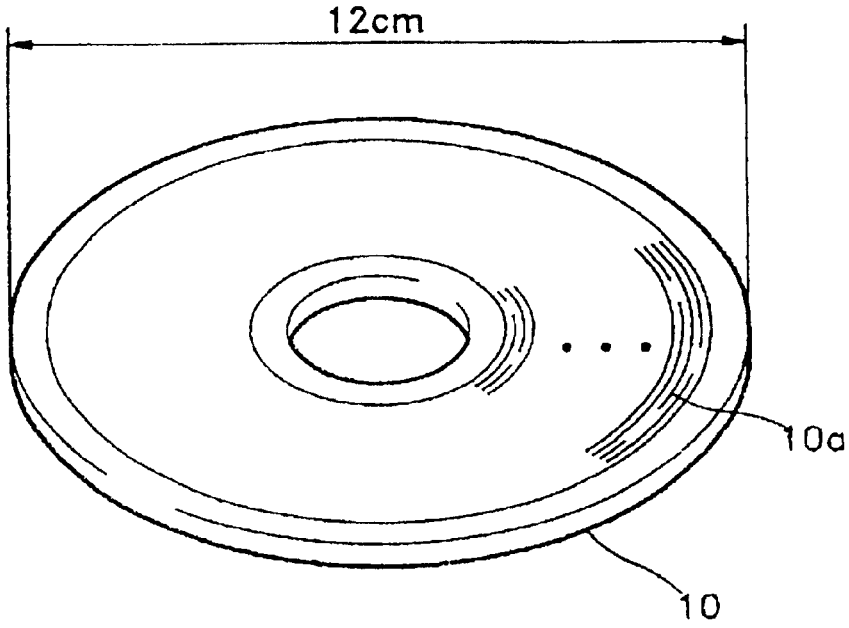
FIG. 1 PRIOR ART
FIG. 1 is a perspective view of an abstract representation of the structure of a commercially available compact disk for a CD-ROM drive.
Figure 2A:
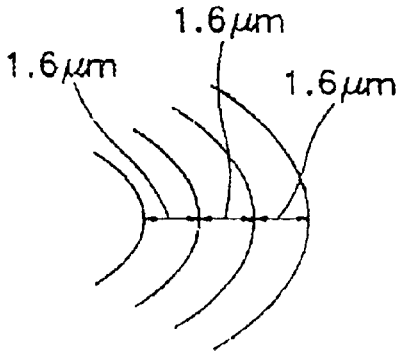
FIG. 2A is a diagram partially showing the track structure of a compact disk of the type shown in FIG. 1, configured with a standard pitch.

Turning now to the drawings, a compact disk 10 is a small disk with, for example, a twelve centimeter outer diameter as shown in FIG. 1, on which a plurality of concentric or spiral tracks 10a are formed. These tracks comprise a multitude of fine grooves whose size corresponds to several micrometers are formed. These grooves are formed in one side of the compact disk 10 and represent predetermined digitalized signals such as audio information signals and computer information signals. Each groove is called a pit and the space between the pits are called islands or lands. As shown in FIG. 1, tracks 10a are spirally arranged from the center of the disk and the interval between the tracks is known as a pitch, and this interval or pitch is generally 1.6 μm as shown in FIG. 2A.

Figure 2B:
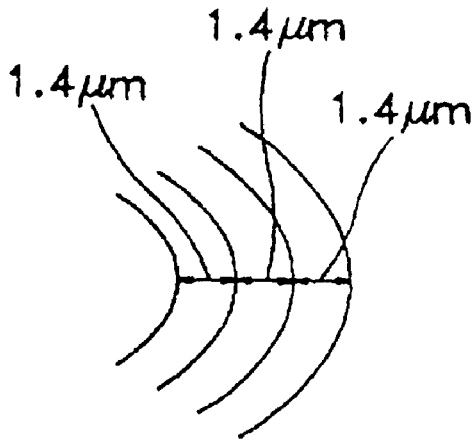
FIG. 2B is a diagram partially showing the track structure of a compact disk of the type shown in FIG. 1, configured with a pitch being smaller than the standard pitch.
Figure 2C:
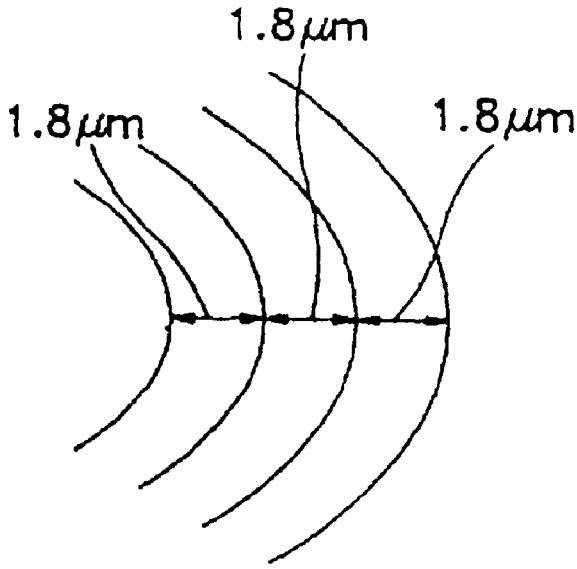
FIG. 2C is a diagram partially showing the track structure of a compact disk of the type shown in FIG. 1, configured with a pitch being greater than the standard pitch.

When driving a sled motor for transferring a pickup of the CD-ROM drive radially across disk 10, the rotation of the sled motor is controlled using a general frequency generator. That is, when designing the CD-ROM drive, a predetermined number of tracks in the disk correspond to a single pulse generated from the frequency generator. For example, the CD-ROM drive is designed such that a constant number of track zero crossing signals are always generated on the basis of a single rotation of the disk. However, due to a problem in the manufacturing of the disk, the width of the pitch formed on the disk may be 1.4 μm or 1.8 μm as shown in FIGS. 2B and 2C, which are smaller and greater than the standard pitch of 1.6 μm, respectively. That is, since the width of the pitch is not uniform, a different number of track zero crossing signals is generated for each disk. In addition, the difference in pitch causes an error in calculations performed during a track searching operation.

Therefore, in order to solve the above problem relating to the error in the above mentioned calculation, the conventional CD-ROM drive adopts a method in which a program area of the disk is divided into twenty-four pages and the search is performed from a current page to an arbitrary page different from the current page, and then a searching error detected from the search process is reflected in the current page to update data of the current page. According to conventional practice however, sufficient data updating should be achieved with respect to each current page so as to secure the ensuing correct search. Also, due to the deviation generated when the pickup searches the tracks from the inner circumference to the outer circumference of the disk, or from the outer circumference to the inner circumference of the disk, a microcomputer inner memory of 24(pages)×2×2 bytes is used, which causes a lower efficiency in usage of the memory. Also, when the borders of the twenty-four pages of the disk are searched, the result obtained by calculating the track number is not reliable. In addition, when measuring the access time in the initial driving state of the CD-ROM drive, the track number is set on the basis of a test performance of only 100 to 500 access time measurements. Accordingly, since the CD-ROM drive is not under a sufficiently stable condition, accuracy on the track search by the pickup is lowered.

Figure 3:
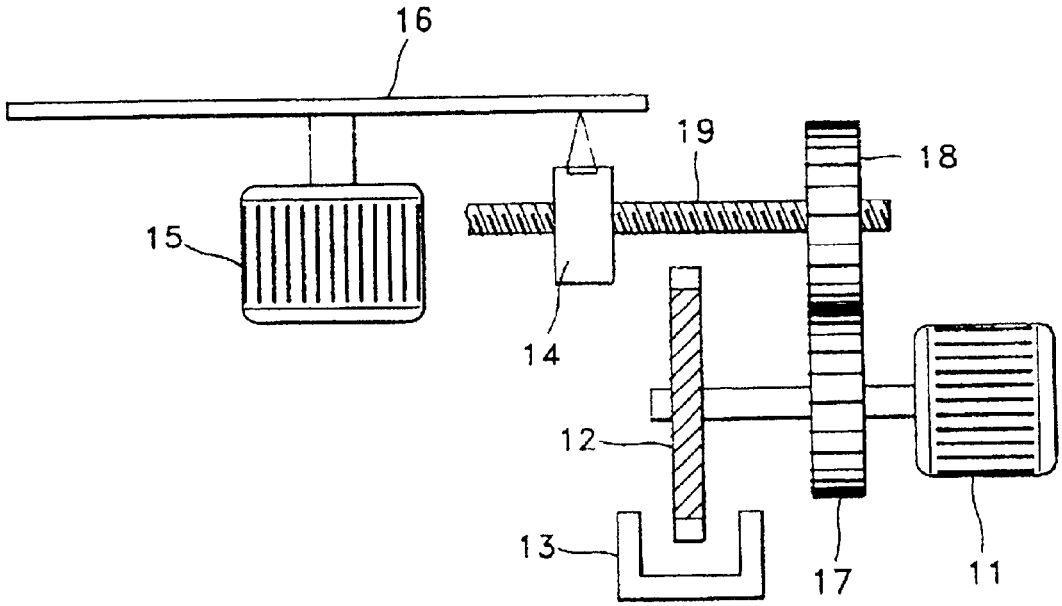
FIG. 3 is a schematic diagram of a mechanism for enabling a CD-ROM drive to perform disk calibration according to the principles of the present invention.

Shown in FIG. 3, is a CD-ROM disk drive system having a frequency generator 12 for generating a pulse used to detect an amount of rotation of a sled motor 11 installed at the end of a shaft of sled motor 11, and an optical sensor 13 for detecting the rotation of frequency generator 12 is installed adjacent the frequency generator 12. Optical sensor 13 detects the pulse generated from frequency generator 12 in accordance with the rotation of sled motor 11. Here, the CD-ROM drive is designed so that frequency generator 12 generates 20 pulses and a pickup 14 jumps 480 tracks on a disk 16, during a single rotation of the sled motor 11. The current jumping amount of the pickup 14 is calculated on the basis of the number of pulses generated from the frequency generator 12 while the tracks are being searched by the pickup 14. Disk 16 is rotated by spindle motor 15. Also, reference numerals 17 and 18 represent gears engaged to each other in accordance with the radiation of sled motor 11, and reference numeral 19 is a sled with a rack structure, which reciprocates pickup 14 in accordance with the rotation of gears 17 and 18.

Figure 4:
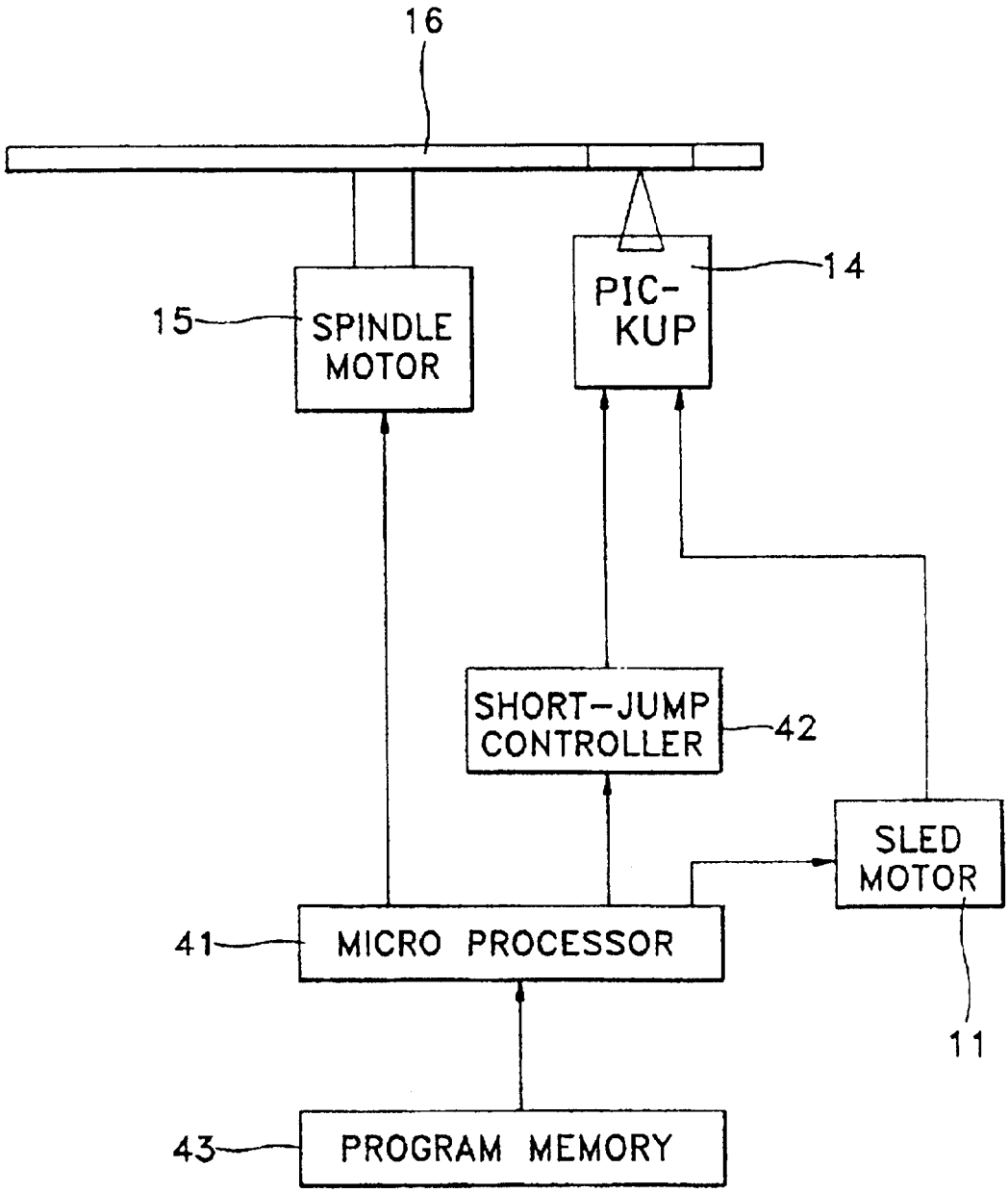
FIG. 4 is a block diagram schematically illustrating a circuit for the CD-ROM drive shown in FIG. 3 constructed according to the principles of the present invention.

Also, as shown in FIG. 4, the CD-ROM disk drive system includes a microprocessor 41 for controlling the whole system, a short-jump controller 42 for controlling a short jump of pickup 14 in accordance with a control command from microprocessor 41, and a program memory 43 for storing various data used for reproducing information from disk 16.

Figure 7:
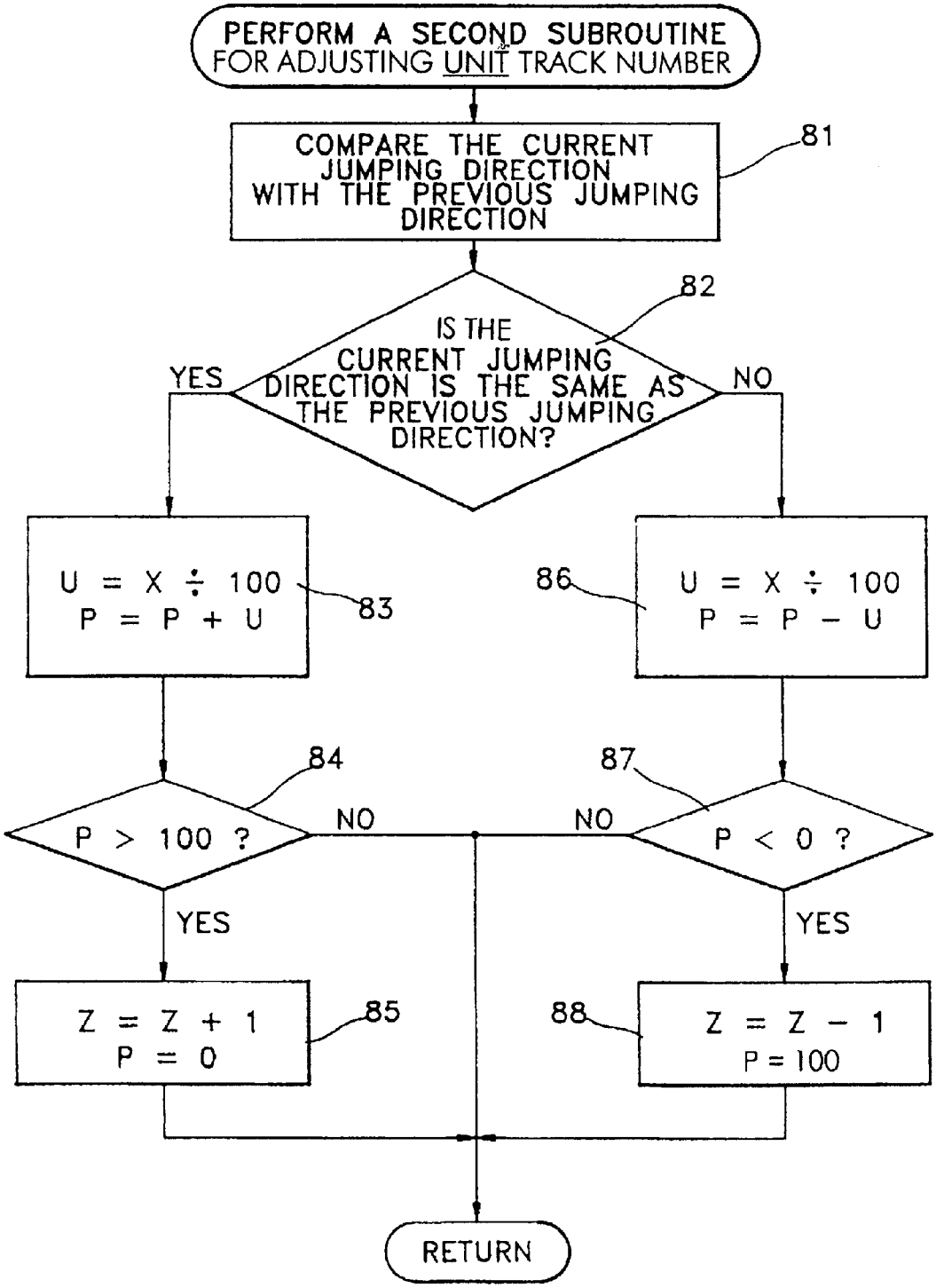
FIG. 7 is a flowchart illustrating the steps for performing a second subroutine for adjusting track numbers in the disk calibration process performed according to the principles of the present invention.

Next, the disk caliration and search operation of the present invention, performed by the above CD-ROM disk drive system, will be described with reference to FIGS. 5, 6 and 7.

FIG. 5 is a flowchart depicting a first subroutine performed by microprocessor 41 for disk calibration. When a disk is replaced by a new disk or the CD-ROM drive is reset, the CD-ROM drive initializes itself, step 51. Here, the term "initialization" means a chain of processes for starting such operations as focusing, tracking, and motor servo control. After initialization is completed, pickup 14 of the disk drive jumps to an inner circumference of the disk, that is, to a predetermined initial position, step 52, such as the track lead-in area. Then, while pickup 14 of the disk drive jumps towards the outer circumference of the disk, step 53, a counter (not shown) installed in microprocessor [14] *41* counts, step 54, the number of pulses generated from frequency generator 12 in accordance with the rotation of sled motor 11. Here, the track number can be counted by counting the pulse number. It should be noted, however, that the counting operation is delayed for a predetermined period (e.g., 500 μsec), in order to stabilize the pickup 14 after the initial jump in step 52. Also, since the pulse is counted on the basis of the edge of the pulse, [it is checked, step 55,] *a check is made during step 55 to determine* whether the starting point of the pulse counting is the edge of the pulse, prior to the actual counting of the number of pulses generated from [the] frequency generator 12. When the starting point of the pulse counting is not the edge of the pulse, the counter existing in [the] microprocessor 41 continuously checks whether the starting point is the edge of the pulse. When the starting point is the edge of the pulse, it is checked whether a track is detected by pickup 14, step 56. When a track is not detected by pickup 14, microprocessor 41 continuously checks pickup 14 for the detection of a track.

For each track detected by pickup 14, a counter accumulatively sums the number of the tracks detected, step 57. Thereafter, [it is checked] *a check is made to determine* whether the pulse number counted by the counter of [the] microprocessor 41 is equal to or greater than 160, step 58. Here, the number 160 was determined based on the data which is obtained through 8 full rotations of the disk during all experimental procedures using the CD-ROM drive system designed so that frequency generator 12 generates 20 pulses per one rotation of the disk. If the pulse number is not equal to or greater than 160 in step 58, the processes are repeated from step 56. Otherwise, when the pulse number is equal to or greater than 160, a frequency generator track number (Z) is calculated by [diving] *dividing* the summed track number by 160, step 59,[.] ie., microprocessor 41 calculates a unit track number of the disk per a single movement of pickup 14, that is, the number of tracks the pickup moves per pulse generated by the frequency generator. The calculated track number (Z) is stored (set) in program memory 43, step 60, and the process returns to a root program in microprocessor 41 in order to perform another rotation. Microprocessor 41 also calculates an average pitch between the tracks in accordance with the calculated unit track number.

Through the above chain of steps, the initial disk calibration operation is completed. Then, on the basis of the track number (Z) stored in the program memory 43, a number of tracks to be jumped by the pickup 14 for performing a search operation is converted into a pulse number to be generated by frequency generator 12 during program performance.

Referring now to FIG. 6, a search subroutine for jumping the pickup to a target track from a current position is performed in the disk drive on the basis of the frequency generator track number (Z) set as described above. First, microprocessor 41 controls pickup 14 to jump to the target track using the frequency generator track number Z as data, so as to initialize the track number to the target track. Here, if an error is generated during this jumping process, where the frequency generator track number (Z) is not equal to the track number to the target track, the search operation is repeatedly performed to adjust the track number to the target track, thereby initializing the adjusted track number, step 61.

Next, the current location of pickup 14 on disk 16 is read out and the distance from the read out current position to the target track is calculated, step 62. After the distance calculation, a number of tracks (X) to be jumped by pickup 14 is calculated, step 63, and then it is determined whether a long jump is required or not, step 64. The determination of whether a long jump is required is based on the number of tracks (X) to be jumped. If the long jump is not required, pickup 14 performs a short jump, step 65. A short jump is a jump of a predetermined number of tracks. Then, it is checked in step 66 whether the intended target track was reached by the short jump. If the short jump does not reach to the target track, a value, such as one, is added to the initial track number to the target track, i.e., the initial value of the number of tracks (X) to be jumped, step 66, and then the process returns to the step 62. If the short jump reaches the target track, the process returns to the root program in microprocessor 41.

On the other hand, if it is determined in the step 64 that the long search (*i.e., a "long jump"*) is required, a check is made to determine whether the track number to the target track is equal to a value obtained by adding one to the initial value of the number of tracks (X) to be jumped, step 68. If the track number is not equal to the value obtained by adding one to the initial value, the [track] number *of tracks* (X) to be jumped by the pickup is divided by the [initial] *unit* track number [to] *for* the [traget] *target* track, step 69 to obtain a value (Y). Then, in step 70, the sled motor 11 is rotated in accordance with a pulse number converted from the value (Y) obtained in [the] step 69, and then the process proceeds to step 66 discussed above.

On the other hand, when it is determined in step 68 that the track number to the target track is equal to the value obtained by adding one to the initial value, a second subroutine for adjusting the track number is performed, step 71, and then the process proceeds to step 69 discussed above. Here, this second subroutine for adjusting the track number is for compensating *for* a search error generated during the search subroutine performance due to a defect of the disk.

The process of this second subroutine for adjusting the track number will be described with reference to FIG. 7. First, the current jumping direction and the previous jumping direction are compared (step 81). Then, it is checked whether the current jumping direction is the same as the previous jumping direction (step 82). If the current jumping direction is the same as the previous jumping direction, a value (U) is obtained by dividing the track number (X) to be jumped by [the] pickup 14 by 100. Here, the numerals "100" is arbitrarily set for the convenience of calibration with regard of 300~400 error tracks. The value (U) is added to a value (P) obtained by accumulatively summing the values (U) to set a new value (P) (step 83). Then, it is determined [that] *whether* the newly set value (P) is over 100 (step 84). If the newly set value (P) is over 100, a value obtained by adding one to the frequency generator track number (Z) is set as a new frequency generator track number (Z) and the value (P) is set as zero. This adjusted frequency generator track number is stored in the microprocessor 41. Otherwise, if it is determined in the step 84 that the value (P) is not over 100, the process returns to the root program.

On the other hand, if it is determined in the step 82 that the current jumping direction is not equal to the previous jumping direction, a value (U) is obtained by dividing the track number (X) to be jumped by the pickup 14 by 100 and the value (U) is subtracted from value (P) to set a new value (P) (step 86). Then, it is determined whether the newly set value (P) is below zero (step 87). If the newly set value (P) is not below zero, the process returns to the root program. Otherwise, if the newly set value (P) is below zero, a value obtained by subtracting one from the frequency generator track number (Z) is set as a new frequency generator track number (Z) and the value (P) is set as 100 (step 88).

As described above, in the disk calibration method in the disk drive according to the present invention, the track number of each disk inserted into the disk drive is adjusted at the initial state in accordance with the number of pulses generated from the frequency generator, thereby improving accuracy in the disk calibration. Also, the error generated during the searching operation of the pickup is compensated through a simple process. Furthermore, since less internal memory is used for performing the above calibration process, the memory efficiency is increased.

What is claimed is:

1. A disk calibration and search method in a disk drive, comprising the steps of:

positioning a data reading pickup across to a first position on a disk;

jumping said pickup in a predetermined direction across tracks on said disk;

counting the number of tracks detected during said jumping step;

calculating a unit track number of the disk per a single movement of a driving means for jumping the pickup and calculating an average pitch between the tracks in accordance with the calculated unit track number; and determining a moving amount for controlling the driving means to jump the pickup from a current position to a target track.

2. A disk calibration and search method as set forth in claim 1, further comprising a step of delaying said step of counting for a predetermined initial period to stabilize said pickup.

3. A disk calibration and search method as set forth in claim 1, further comprising a step of performing a searching operation by jumping the pickup from the current position to the target track.

4. A disk calibration and search method as set forth in claim 3, said step of performing the searching operation comprises the steps of:

jumping said pickup to a target track to check the track number to the target track, thereby initializing the track number with the checked track number to obtain an initial value;

reading out the current location of the pickup on the disk and calculating a number of tracks (X) necessary to jump said pickup from said current position and said target track;

determining, on the basis of said number of tracks (X), whether a long jump is required to move said pickup to said target track;

performing a short jump for moving said pickup towards said target track when it is determined that said long jump is not required;

determining whether said pickup reached said target track after said short jump;

adjusting said initial value by adding one to said initial and returning the process to said step reading out the current location of said pickup when said pickup does not reach said target track after said short jump;

checking whether the number of tracks (X) to the target track is equal to a value obtained by adding one to the initial value when said long jump is required;

dividing said number of tracks (X) to be jumped by the pickup by said initial value, when said number of tracks (X) to the target track is not equal to a value obtained by adding one to said initial value;

moving the driving means of the pickup on the basis of a value obtained by said dividing step; and re-adjusting the track number by regulating said average pitch when said number of tracks (X) to the target track is equal to a value obtained by adding one to the initial value.

5. A disk calibration and search method as set forth in claim 4, said re-adjusting step comprising the steps of:

determining whether a current jumping direction of said pickup is equal to a previous jumping direction of said pickup;

dividing the number of tracks (X) to be jumped by the pickup by a reference value and adding the obtained value to a previously accumulated value to provide a first accumulated value when it is determined that the current jumping direction is equal to said previous jumping direction;

determining whether said first accumulated value is greater than said reference value;

adjusting said unit track number by adding a predetermined value to said unit track number when said first accumulated value is greater than said reference value and resetting said first accumulated value to zero;

dividing said number of tracks (X) to be jumped by the pickup by said reference value and subtracting the obtained value from the previously accumulated value to provide a second accumulated value said current jumping direction is not equal to said previous jumping direction;

determining whether said second accumulated value is less than zero; and adjusting said unit track number by subtracting said predetermined value from said unit track number when said second accumulated value is less than zero.

6. A disk calibration and search method for a disk drive having a disk mounted therein, a frequency generator for generating a pulse used to detect an amount of rotation of a sled motor installed at an end of a shaft of a sled motor, an optical sensor installed adjacent said frequency generator for detecting rotation of said frequency generator, a pickup for reading data and detecting tracks on said disk, said disk being rotated by a spindle motor, drive means for moving said pickup, a microprocessor for controlling said disk drive, a short-jump controller for controlling a short jump of said pickup in accordance with a short jump control command from said microprocessor, and a program memory for storing various data used for reproducing information from said disk, said method comprising steps of:

jumping said pickup to a first position on said disk;

jumping said pickup from said first position towards a second position on said disk;

counting tracks detected by said pickup when jumping towards said second position;

counting pulses generated by said frequency generating means while jumping said pickup towards said second direction to obtain a summed track number;

stopping said step of counting tracks when said step of counting pulses counts a predetermined number of pulses;

dividing said summed track number by said predetermined number of pulses to obtain a frequency generator track number;

storing said frequency generator track number in said program memory; and searching for a target track on the basis of said stored frequency generator track number.

7. The method as set forth in claim 6, further comprising a step of delaying said step of counting pulses by a predetermined delay period.

8. The method as set forth in claim 6, further comprising a step of starting said step of counting pulses when an edge of said pulse is detected.

9. The method as set forth in claim 6, said step of searching for a target track comprising steps of:

generating an initial value representing an initial number of tracks to said target track;

reading out a current position of said pickup;

calculating a distance from said current position to said target track;

determine a number of tracks to be jumped by said pickup to move said pickup to said target track in response to said calculated distance;

determining whether a long jump jump is required to move said pickup to said target track;

determining whether said number of tracks to be jumped to said target track is equal to a predetermined value added to said initial value;

dividing said number of tracks to be jumped by said initial value when said number of tracks to be jumped to said target track is not equal to said predetermined value added to said initial value;

converting the result obtained by said dividing step to a pulse number;

rotating said sled motor in response with said pulse number.

10. The method as set forth in claim 9, further comprising steps of controlling said short-jump controller to jump said pickup a short jump towards said target track when said long jump is not required;

determine whether said pickup has reached said target track after said rotating step and after said controlling step;

adding said predetermined value to said initial track number and returning to said step of reading out a current position of said pickup when it is determined that said pickup has not reached said target track; and returning to a root program of said microprocessor when said pickup has reached said target track.

11. The method as set forth in claim 9, further comprising a step of:

adjusting said number of tracks to said target track when said number of tracks to be jumped to said target track is equal to said predetermined value added to said initial value.

12. The method as set forth in claim 11, said adjusting step comprising steps of:

comparing a current jumping direction with a just previous jumping direction;

determining whether said current jumping direction is the same as said just previous jumping direction;

dividing said number of tracks to be jumped by a reference value and adding the obtained value to a previously accumulated value to provide a first accumulated value when it is determined that the current jumping direction is the same as said just previous jumping direction;

determining whether said first accumulated value is greater than said reference value; and adjusting said number of tracks to said target track by adding said predetermined value to said number of tracks to said target track when said first accumulated value is greater than said reference value and resetting said first accumulated value to zero.

13. The method as set forth in claim 12, further comprising steps of:

dividing said number of tracks to said target track to be jumped by the pickup by said reference value and subtracting the obtained value from the previously accumulated value to provide a second accumulated value when said current jumping direction is not the same as said just previous jumping direction;

determining whether said second accumulated value is less than zero; and adjusting said number of tracks to said target track by subtracting said predetermined value from said number of tracks to said target track when said second accumulated value is less than zero.

14. The method as set forth in claim 6, said step of jumping said pickup to a first position comprises jumping said pickup to an inner circumference of said disk.

15. The method as set forth in claim 14, said step of jumping said pickup towards said second position comprises jumping said pickup to an outer circumference of said disk.

16. The method as set forth in claim 6, said first position comprising a lead in area of said disk, said second position comprising a lead out are of said disk.

17. The method as set forth in claim 8, further comprising a step of determining when said pickup detects a track when said edge of said pulse is detected.

*18. A method in a disk drive, comprising the steps of:*

*activating a motor moving a data reading pickup from a first track to a second track for a period of time;*

*counting a first number of tracks during moving of said data reading pickup; and*

*determining a unit track number by dividing said number of tracks by said period of time.*

*19. The method of claim 18, wherein said unit track number represents a track pitch.*

*20. The method of claim 18, wherein said unit track number represents an average track pitch of said tracks.*

*21. The method of claim 18, further comprising the step of storing said unit track number in a memory.*

*22. The method of claim 18, further comprising the steps of:*

*detecting the number of pulses generated from said motor, the number of pulses representing said period of time; and*

*determining said unit tract number by dividing said first number of tracks by said number of pulses.*

*23. The method of claim 22, wherein said unit track number represents an average track of said tracks.*

*24. The method of claim 22, further comprising the steps of:*

*rotating a disk while said data reading pickup is moving;*

*providing said motor moving said data reading pickup in a rate of a predetermined distance per each rotation of said disk during said period of time; and*

*generating said number of pulses in response to all of each predetermined distance.*

*25. The method of claim 22, further comprising the steps of:*

*rotating a disk while said data reading pickup is moving; and*

*detecting said number of pulses generated from said motor in response to movement of said data read pickup, said number of pulses representing the number of rotation of said disk.*

*26. The method of claim 22, further comprising the steps of:*

*determining a second number of tracks between a current track and a target track;*

*determining a second number of pulses by dividing said first amount by said unit track number; and*

*activating said motor to move said data reading pickup in accordance with said second number of pulses.*

*27. The method of claim 22, further comprising the steps of:*

*storing said unit track number in a memory;*

*determining a second number of tracks between a current track and a target track;*

*determining a second number of pulses by dividing said first amount by said unit track number; and*

*activating said motor to move said data reading pickup in accordance with said second number of pulses.*

*28. The method of claim 22, further comprising the steps of:*

*storing said unit track number in a memory;*

*determining a second number of tracks between a current track and a target track;*

*determining a second unit track number in dependence upon said first number of tracks and said second number of tracks*

*determining a second number of pulses by dividing said second number of tracks by said second unit track number; and*

*activating said motor to move said data reading pickup in accordance with said second number of pulses.*

*29. The method of claim 22, further comprising of the step of storing said second track number in said memory.*

*30. A disk calibration and search method in a disk drive, comprising the steps of:*

*positioning a data reading pickup across to a first position on a disk;*

*jumping said pickup in a predetermined direction across tracks on said disk;*

*counting the number of tracks detected during said jumping step;*

*calculating a unit track number of the disk per a single movement of a driving means for jumping the pickup; and*

*determining a moving amount for controlling the driving means to jump the pickup from a current position to a target track.*

*31. A disk calibration and search process, comprising:*

*making a count of a number of tracks crossed when a pickup is jumped to a first position and moved radially from said first position during generation of a selected number of pulses;*

*determining an unit track number in dependence upon a relation between said count and said selected number;*

*determining an average pitch between said tracks in dependence upon said unit track number; and*

*determining a moving amount to shift the pickup between a current position on the disk and a target track, in dependence upon said average pitch.*

*32. The process of claim 31, making said count while moving said pickup from a track on one extremity of the disk to a track on a radially opposite extremity of the disk.*

*33. The process of claim 31, with said first position comprised of an innermost track of said disk, and with said count made while said pickup is moved radially from said innermost track to an outermost track of said disk.*

*34. The process of claim 31, comprised of initiating said count after detecting an edge of said pulses.*

*35. A disk drive, comprising:*

*a motor;*

*a pickup oriented to make a count of a number of tracks on a memory disk crossed when said motor jumps said pickup to a first position on the disk and moves said pickup radially from said first position in response to application of a selected number of pulses to said motor; and*

*a controller determining an unit track number in dependence upon a relation between said count and said selected number, determining an average pitch between said tracks in dependence upon said unit track number, and determining a moving amount to shift the pickup between a current position on the disk and a target track, in dependence upon said average pitch.*

*36. The disk drive of claim 35, comprised of said controller making said count while said motor moves said pickup from a track on one extremity of the disk to a track on a radially opposite extremity of the disk.*

*37. The disk drive of claim 35, with said first position comprised of an innermost track of said disk, and with said controller making said count while said pickup is moving radially from said innermost track to an outermost track of said disk.*

*38. The disk drive of claim 35, comprised of said controller initiating said count after detecting an edge of said pulses.*

*39. A disk drive manufacturing process, comprising:*

*selecting a motor;*

*mounting a pickup oriented to make a count of a number of tracks on a memory disk crossed when said motor jumps said pickup to a first position on the disk and moves said pickup radially from said first position in response to application of a selected number of pulses to said motor; and*

*making an operational connection between a controller and said motor and said pickup, with said connection enabling said controller to determine a unit track number in dependence upon a relation between said count and said selected number, determine an average pitch between said tracks in dependence upon said unit track number, and determine a moving amount to shift the pickup between a current position on the disk and a target track, in dependence upon said average pitch.*

*40. The process of claim 39, comprised of said controller making said count while said motor moves said pickup from a track on one extremity of the disk to a track on a radially opposite extremity of the disk.*

*41. The process of claim 39, with controller designating said first position comprised of an innermost track of said disk, and with said controller making said count while said pickup is moving radially from said innermost track to an outermost track of said disk.*

*42. The process of claim 39, comprised of said controller initiating said count after detecting an edge of said pulses.*

*43. A disk calibration and search process, comprising:*

*moving a pickup radially from a track on one extremity of the disk to a track on a radially opposite extremity of the disk;*

*beginning a count of pulses with an edge of a plurality of pulses generated during said movement;*

*making a count of a number of tracks crossed during said movement; and*

*determining a track number in dependence upon a relation between said count of said number of said count of pulses.*

*44. The process of claim 43, with said one extremity comprised of an innermost track of said disk, and with said count of said number being made while said pickup is moved radially from said innermost track to an outermost track of said disk.*

*45. A disk calibration and search process, comprising:*

*moving a pickup to a location on the disk and reading from said disk a current position of the pickup on the disk while said pickup is at said location;*

*establishing an initialized value by determining a number of tracks lying between said location and a designation of a target track;*

*characterizing relatively of a movement of said pickup from said location to said target track as one of a longer jump and shorter jump;*

*when said movement is characterized as a shorter jump, moving said pickup in conformance to said shorter jump and making a determination of whether said pickup has reached said target track;*

*when said movement is characterized as a longer jump, establishing an adjusted value when said target track corresponds to an addition of one to said initialized value, and after moving said pickup in correspondence to a pulse value obtained by dividing said number of tracks by said adjusted value, making said determination of whether said pickup has reached said target track;*

*when said movement is characterized as a longer jump and said target track does not correspond to said addition, and after moving said pickup in correspondence to a pulse value obtained by dividing said number of tracks by said initialized value, making said determination of whether said pickup has reached said target track; and*

*establishing said initialized value again when said determination indicates that said pickup has not reached said target track after said moving of said pickup.*

*46. The process of again establishing said initialized value as set forth in 45, comprised of:*

*adding one to said designation of said target track;*

*reading from said disk a current position of the pickup on the disk; and*

*setting said initialized value to indicate a number of tracks lying between said current position and said designation of said target track.*

* * * * *